S. Darling.
Making Metallic Squares.
No. 2869 Reissued Feb. 18, 1868
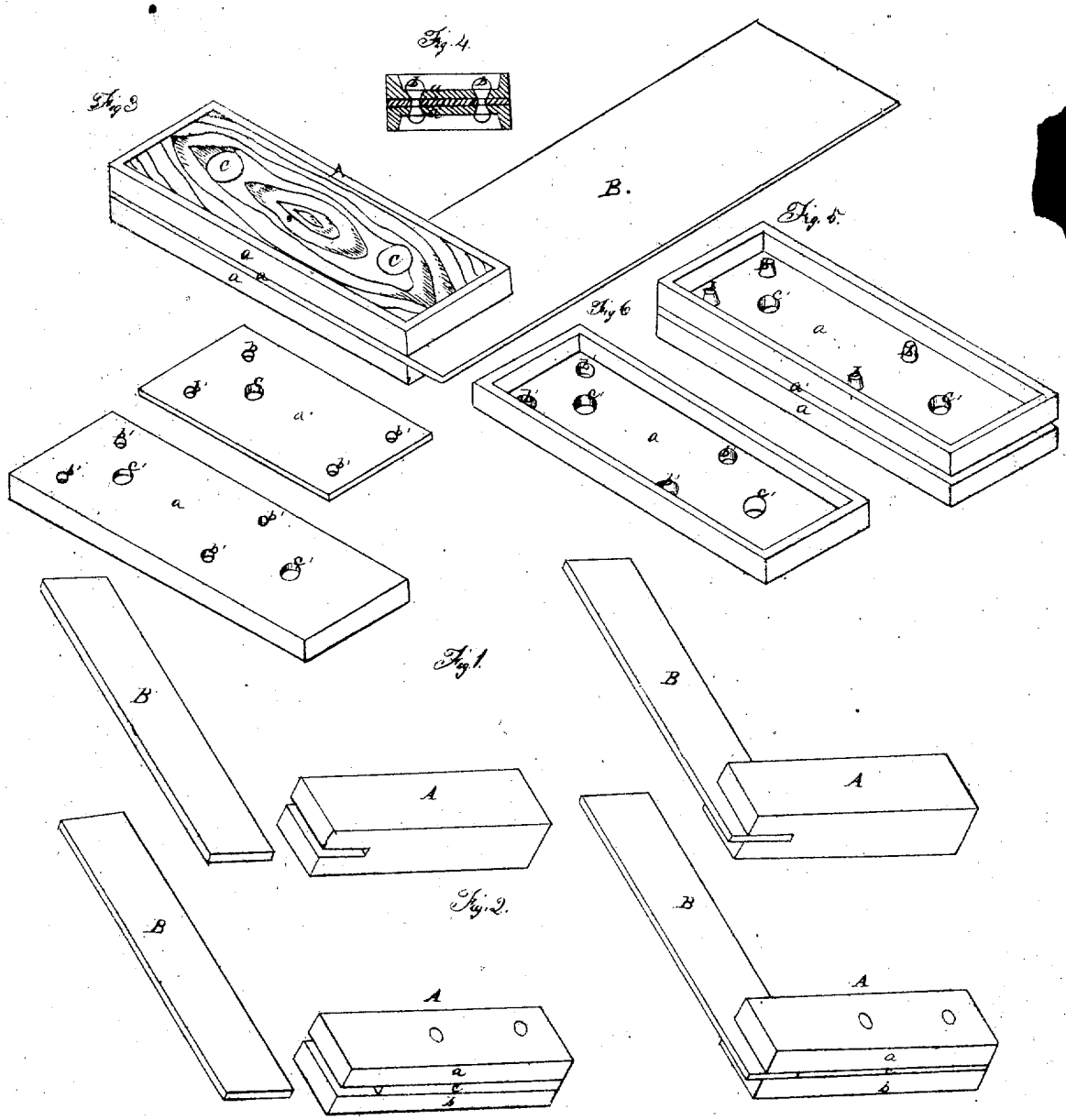

United States Patent Office.

SAMUEL DARLING, OF BANGOR, MAINE.

*Letters Patent No.* 18,327, *dated October* 6, 1857; *reissue No.* 2,869, *dated February* 18, 1868.

IMPROVEMENT IN THE MANUFACTURE OF METALLIC SQUARES.

The Schedule referred to in these Letters Patent and making part of the same.

TO ALL WHOM IT MAY CONCERN:

Be it known that I, SAMUEL DARLING, of Bangor, in the county of Penobscot, and State of Maine, have invented certain new and useful Improvements in the Manufacture of Beam-Squares; and I do hereby declare that the following is a full, clear, and exact description thereof, sufficient, in connection with the accompanying drawings, to enable those skilled in the art to practise my invention.

My improvements relate to a novel mode of constructing a metallic square, and consist in fastening the tongue to the beam in a manner that insures greater accuracy in the square and greater durability than has heretofore been attained; in making the beam in three parts to insure the more perfect fitting of the tongue to the beam; in facing the sides of the beam with wood; in making the tongue harder at its edges than at its centre; in the mode or process of hardening the edges by pressure between plates of cold iron, and in another mode or process of hardening the edges by confining the tongue between pieces of iron and then heating and tempering.

Figure 1 represents in perspective the square, the beam of which is composed of but one piece, and shows the tongue and beam separate and also united together.

Figure 2 represents a square, the beam of which is composed of three pieces, and shows the tongue and beam separate, and also united together.

Figure 3 represents a square, the sides of the beam of which are faced with wood.

Figure 4 represents the three sections of said beam riveted together and before the wood-facing has been secured to the beam.

Figure 5 represents a cross-section of the same through the rivets.

Figure 6 represents the three sections of the beam separated.

In fig. 1, A represents the beam of the square, which may be made of steel, iron, brass, or any other metal, and has in one end a notch or slot for the tongue to fit into; and B represents the tongue thereof, which is made of steel, for the sake of durability. In this figure the beam is shown as made of a single piece of metal, and the slot or notch for the reception of the tongue is sawed into the end of the beam in a manner well known to mechanicians.

The parts of the square need not be further described, as they may be of any of the generally-adopted forms, provided that the beam is notched in one end.

Preparatory to inserting the tongue into the notch in the beam, which is fitted for it, the end of the tongue and the sides of the notch are coated with tin, zinc, or solder in the usual manner in which hard metals are thus coated. The parts being heated, the end of the tongue is then placed in the notch, the tinned surfaces coming in contact, and the tongue and beam thus arranged are clamped in a former, which sets and holds them firmly in the proper relative position, with their corresponding edges at right angles. The whole is then heated in a bath of melted tallow until the solder melts. It is then withdrawn from the bath and allowed to cool evenly and gradually, and the solder to harden and cement the joint firmly. When the tongue is secured in the notch of the beam in the usual manner, by means of rivets, it is found to be impossible to insure the tongue and beam being exactly at right angles, for although, during the process of riveting, they may be clamped in a former in a proper relative position, yet the process induces strains which develop themselves either at the time the square is removed from the former, or subsequently when it is subjected to the jars and knocks necessarily incident to its practical use, and the tongue is thrown out of the proper angle with the beam; but in soldering the tongue into the beam the square is not subjected to any force that could cause strains, and as it cools evenly, and the solder hardens, the parts retain the same relative position; and this process can easily be repeated with the same square should the tongue, from any cause, be found out of its true position, when removed from the "former," but the process cannot be repeated without much expense and injury to the square.

When the beam is hardened it should be made in three pieces, as above described, inasmuch as a beam made in one piece with a notch in the end could not be hardened without breaking or warping it, so that a tongue could not be fitted into it. Again, when the beam is made in pieces and hardened, the sides of the beam warp in the process of hardening, and in consequence the rivet-holes, which must be previously drilled, will not come exactly opposite to each other, so that in riveting the tongue in, the sides of the beam will be pressed by each other, and the face of the beam will be winding. I consider it impracticable to hold the tongue into a hardened beam by riveting. The soldered joint is also more durable than the riveted one, inasmuch as the solder fills the joint, and unites firmly at every point the entire broad surfaces of contact of the tongue and beam, making a very rigid and permanent connection. Again, when the tongue is riveted, the friction between the surfaces of contact, caused by the clamping action of the rivets, cannot be depended upon to hold the tongue in its place, and the rivets presenting but a small surface to resist pressure, a light blow or strain upon the edge of the tongue at the point will, by pressing the edge of the tongue into the rivets or the rivets into the tongue, (or both,) change the exact relative position of the tongue and beam, and destroy the accuracy of the square. In the present advanced state of the mechanic arts great accuracy is required in try-squares, and a square that varies, say one ten-thousandth part of an inch, from a true right angle, is not considered fit for use.

A modification of my mode of construction heretofore described I have shown in fig. 2, the principal characteristic of which is that the beam is composed of three pieces, united together by rivets or otherwise, while the tongue is a fourth piece, and made of steel, as before mentioned.

The advantages of constructing the beam in this manner are of great importance, and may be stated as follows: When the beam is in one piece and has a deep notch cut into it, as first above described, for the reception of the broad and thin tongue, this notch must be made so deep and narrow that it is a very nice, difficult, and, to an ordinary mechanic, almost an impracticable operation to make it of a uniform and proper width, and at the same time to make its sides sufficiently smooth, true, and parallel to insure a proper fitting of the tongue, for it is not only difficult to apply the tool to the surfaces to be smoothed, but these cannot readily be seen on account of their situation, and the workman consequently applies and expends his labor to more or less disadvantage and loss, and with an inaccurate and not fully satisfactory result. The correct and close fitting of the tongue in the notch is important, whatever method of fastening is adopted, but especially so when the tongue is secured to the beam by solder; for, if the notch be too large, or the work be indifferently done, there may be an excess of solder, which will render the joint less durable and more liable to be injured. I therefore make the three parts of the beam so arranged, that before they are fastened together to make the beam, the surfaces, which in the completed beam form the sides of the notch for the reception of the tongue, are perfectly accessible, and can be trued and smoothed (each separately and independent of the other) to insure a proper contact with the sides of the tongue; also, the middle piece, which is interposed between the other two, can be finished to the exact thickness of the tongue; and thus keep the outside pieces such a distance apart that a notch will be formed, in which the tongue will fit closely and snugly, and be equally in contact throughout the whole surfaces of the notch.

Fig. 2 represents a square constructed on this plan, in which B is the tongue, made similarly to that shown and described in fig. 1, and A is the beam, composed of the three parts, *a a′ a″*, which are illustrated as fastened together by rivets or screws. The middle piece *a′* is of the exact thickness of the tongue B, and is made as much shorter than the two outside pieces *a a″* as the depth of the notch which is to be formed in the end of the beam. Before the three pieces *a a′ a″* are fastened together, it is evident that their surfaces are perfectly accessible and can readily be made true and smooth, so that the parts when put together will fit closely and accurately, and will form in combination a beam of the usual shape, with a notch in one end that will exactly fit the tongue and hold it in the proper position.

Another mode of constructing the beam, when made in three such parts or sections, I have illustrated in figs. 3, 4, 5, and 6. In this case the three pieces, so far as their relative sizes and thicknesses are concerned, bear the same relation to each other as those shown in fig. 2, and last above described; but the side-pieces *a* have their outer sides faced with wood, as shown, for greater convenience in handling, the rivets which unite them passing through the whole, or the wood and side-pieces may be united by screws, the heads of which, after they are in place, being dressed off so as to leave a finished appearance.

Fig. 6 represents the three pieces *a a a* properly drilled at *b b*, &c., to receive the rivets *b*, which are to unite them, one of the outside plates showing a cavity or rebate, extending nearly its whole length and breadth to receive the wood facing. Fig. 5 represents a perspective view, and fig. 4 a cross-section of these three pieces riveted together by the rivets *b*, and fig. 3 the square complete, with the beam A faced with wood, and the tongue B soldered therein in the manner hereinbefore described, *c* representing the heads of the screws which unite the wood and side-pieces, after the same have been dressed off to a smooth and finished surface.

A square cannot long remain accurate and reliable when the edges of the tongue are easily worn or indented, and it is the every-day experience of machinists that unhardened squares are continually getting little bruises upon their edges and corners, which render them unfit for use. The very frequent use also, against the edge of a square, of scratch-awls or other tools used to mark, necessarily wears the edge out of true unless it be very hard; but if the whole tongue be hardened it becomes brittle, and being thin is easily broken. Moreover, when the entire tongue is hardened, it becomes very much warped and twisted, and being in this state very refractory and brittle these warps and twists do not admit of being hammered out. Again, if the steel in the tongue were hardened uniformly, the temper would have to be drawn quite low to prevent it from breaking, and it would be a difficult if not impracticable undertaking to draw the temper in the middle of the tongue and yet leave its edges hard. I therefore harden the tongue at its margin by heating it to a proper temperature and then dipping in water; but in order to confine this hardening process to the edges only, the tongue is kept, during the process, between two blocks of iron, allowing the edges of the tongue to project on all sides. These blocks are then heated with the tongue, and while they prevent the contact of the water, except with its projecting edges, keep up the temperature of the centre, so that it does not cool so rapidly as to become brittle. The same result may be obtained by tempering or hardening the edges by pressure between surfaces of cold iron, leaving the centre unchanged. After being thus tempered, the tongue, if warped, as it is apt to be by the tempering process, may be rendered true by hammering, and its edges ground straight and smooth, the opposite ones being made parallel.

What I claim as new, and desire to secure by Letters Patent, is—

1. A hardened-edged tongue, united by soldering to a beam, constructed substantially as described.

2. A tongue for squares, which is hardened at the edges and soft in the centre, substantially as described.

3. The mode or process described of hardening the edges of the tongue by pressure between plates of cold iron.

4. The mode or process described of hardening the edges of the tongue by confining it between pieces of iron, and then heating and tempering, as described.

SAMUEL DARLING.

Witnesses:

JOHN E. HALL,

A. L. SIMPSON.